Oct. 7, 1941.   E. W. DAVIS   2,257,725
LUBRICATING APPARATUS
Filed Aug. 6, 1937   2 Sheets-Sheet 1
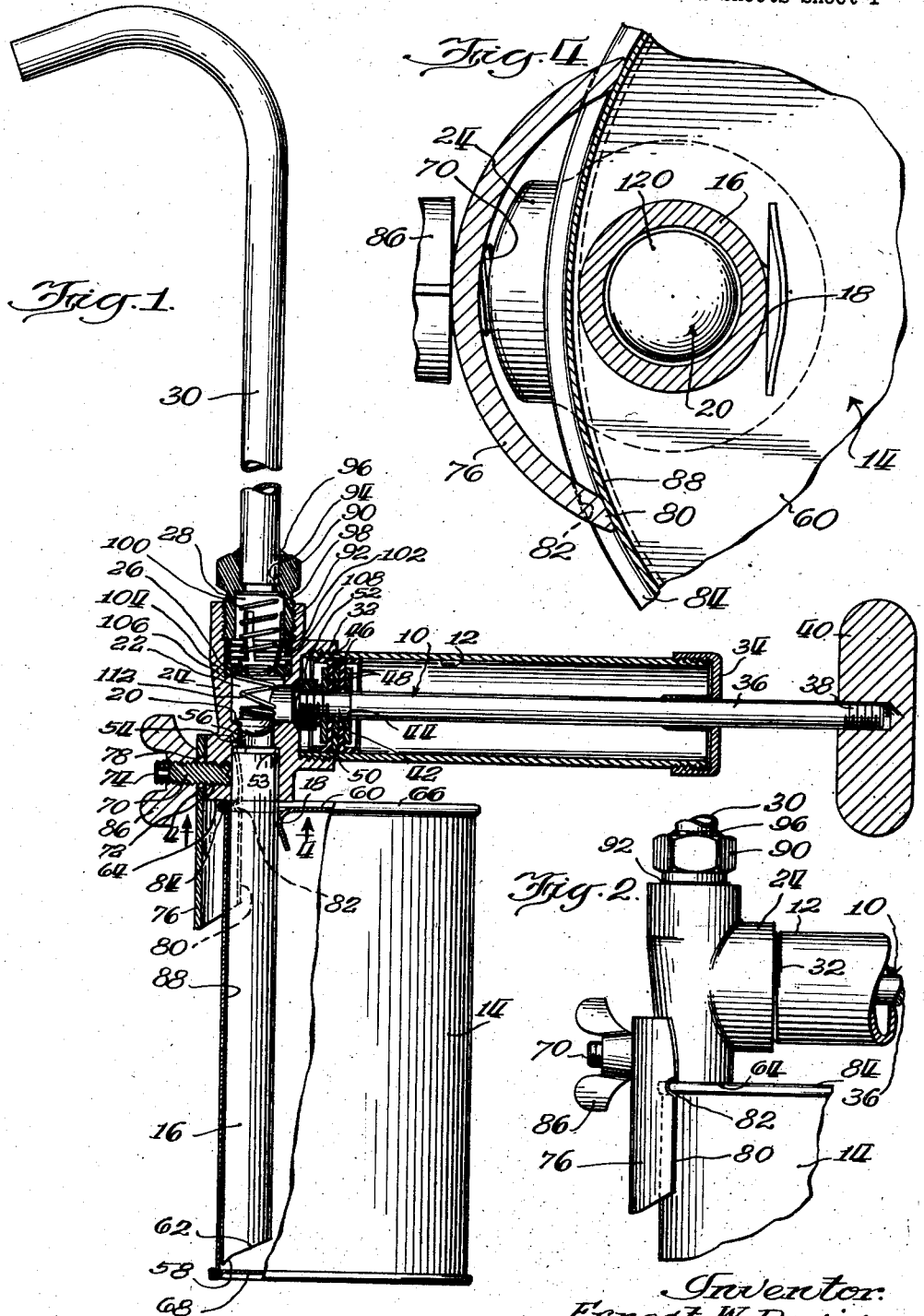
Inventor:
Ernest W. Davis
By Williams, Bradbury, McCaleb & Hinkle
Attys.

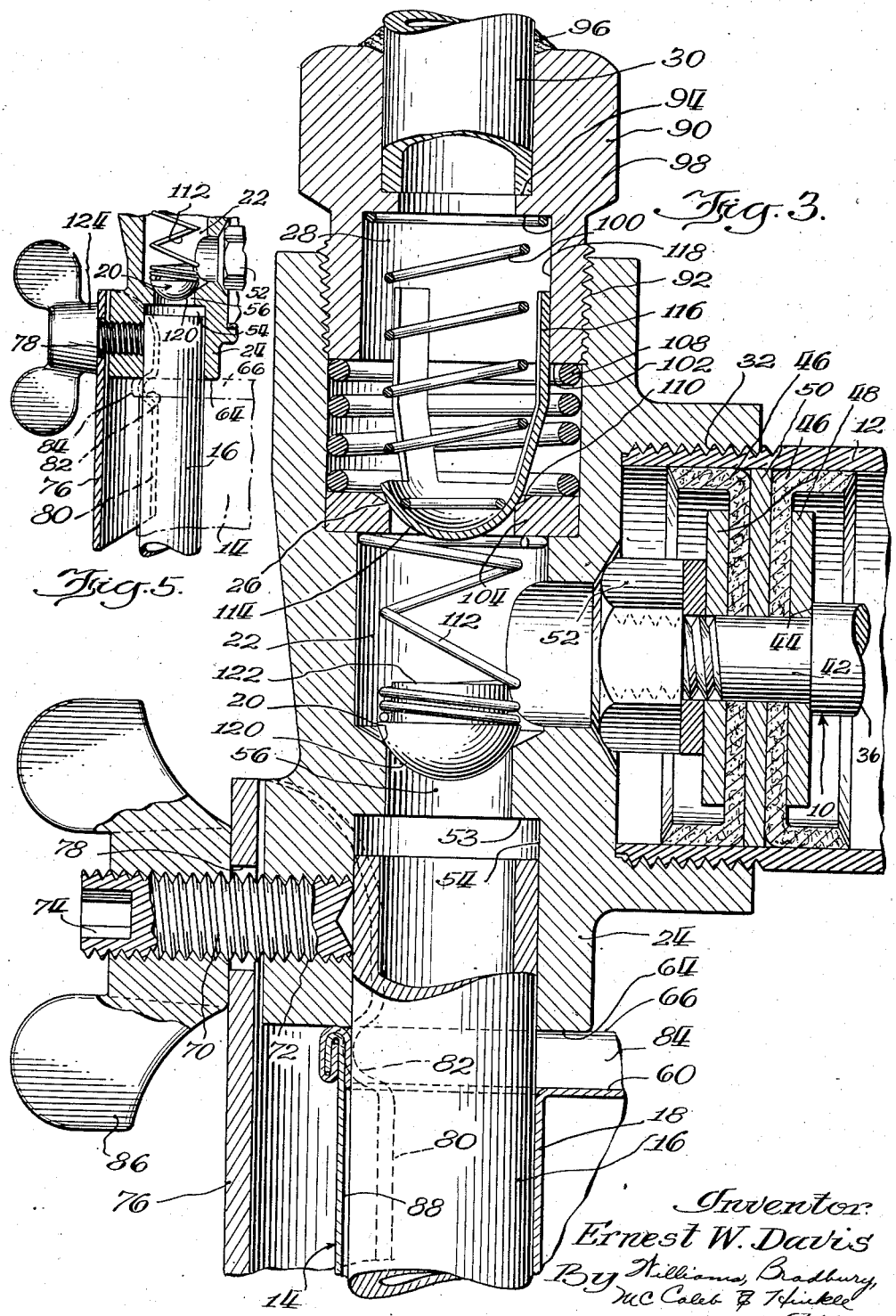

Patented Oct. 7, 1941

2,257,725

UNITED STATES PATENT OFFICE 2,257,725

LUBRICATING APPARATUS

Ernest W. Davis, Oak Park, Ill., assignor to Stewart-Warner Corporation, Chicago, Ill., a corporation of Virginia Application August 6, 1937, Serial No. 157,641

7 Claims. (Cl. 221—85)

The invention relates to lubricating apparatus and more particularly to portable devices for transferring lubricant from a container to a gear housing or the like.

It will be appreciated by those skilled in the art of lubrication, that it is very impractical to attempt to drain lubricant by gravity from a container into a compartment such as the transmission or differential housing of an automobile. The lubricant level plug provided for filling is generally high on the housing or opens at an angle downwardly and is generally surrounded by chassis and body parts which interfere with a gravity filling.

If tubes are used of sufficient length whereby the container can be moved to a point where it can be held at an elevation above the filler opening, so that gravity may be employed, a goodly quantity of lubricant remains in the tube and the customer does not receive his full measure of lubricant supplied in the container. If other conventional expedients are employed, such difficulties are encountered as a spilling of lubricant due to the close quarters, inconvenient angles and interfering running gear encountered, and the lubricant runs a serious danger of becoming contaminated by caked dirt and grit knocked off or jarred loose from the running gear of the automobile.

These dangers and difficulties are particularly manifest with lubricant for hypoid gears where the lubricant is generally made special for each make of car and is sold in refinery sealed quart or gallon containers for replenishment to eliminate excessive bulk stock and to guarantee to the customer the precise lubricant prescribed for his car. The small sized containers make it necessary to use a lubricant transfer means which transfers the entire amount of lubricant in each container without loss or residuum and conveys such to generally inaccessible filler openings with minimum danger of such contaminations as those mentioned.

Consequently, one of the objects of the present invention is to provide an improved means for transferring lubricant from a container to an opening which is comparatively inaccessible in a vertical direction.

Another object of the invention is to provide a means for emptying and transferring the measured quantity of lubricant generally supplied in small sized individual shipping containers.

Another object of the invention is to provide a means for transferring lubricant to a gear housing of an automobile without danger of contamination of the lubricant.

Another object of the invention is to provide an improved device for piercing and emptying a sealed container of its liquid contents.

Another object of the invention is to provide a lubricant dispenser capable of priming itself and clearing itself for the transfer of lubricant from a sealed container without residuum.

Another object of the invention is to provide a device of the class described, which is simple in construction and operation, effective in its use and inexpensive to manufacture and maintain.

These being among the objects of the invention, other and further objects will become apparent from the drawings herein, the description relating thereto, and the appended claims, these and other objects being contemplated.

Fig. 1 is a side elevation, partly in section, of a construction illustrating a preferred embodiment of the invention.

Fig. 2 is an enlarged elevation showing the outward appearance of a portion of the construction shown sectionally in Fig. 1.

Fig. 3 is a magnified sectional view of that portion of the construction shown in Fig. 2.

Fig. 4 is a section taken upon the line 4—4 in Fig. 1.

Fig. 5 is a view similar to that in Fig. 3 illustrating another form of the invention.

Referring now to the drawings in further detail, and particularly to Fig. 1, the embodiment of the invention illustrated will be better comprehended when it is understood that a piston assembly 10 and cylinder 12 having a large displacement are employed to draw lubricant from a container 14 through a tube 16, which is adapted to pierce the container as at 18, past a check valve 20 into a compartment 22 disposed in a casing 24. The lubricant thus drawn past the valve 20 is then forced by the return stroke of the piston assembly 10, past outlet valve 26 which opens from the compartment 22 into a passageway 28 leading through a crooked nozzle 30 adapted to reach and extend within an opening of a gear housing (not shown) for which the lubricant is intended.

More specifically, the cylinder 12 is secured to the casing as by a threaded relationship at 32 at its working end and is provided with a centrally apertured cap 34 at the other end. The piston assembly 10 is reciprocably operable in the cylinder 12 and comprises, briefly, a rod 36 disposed co-axial with the cylinder 12 and extending through the apertured cap 34 beyond which it terminates in a threaded end 38 receiving a handle 40 thereon. At its other end, the rod 36 is provided with a reduced threaded end portion 42 providing a shoulder 44 against which oppositely facing cup washers 46 are held back to back between washers 48 as spaced by a reinforcing disk 50 and secured in assembled relation by the locked nut assembly 52 threaded upon the reduced end portion 42.

The tube 16 at its upper end is slidably received below a shoulder 53 in an enlarged cylindrical portion 54 of a passageway 56 in the casing 24 leading to the inlet valve 20, and at its other end the tube 16 is provided with an acute perforating edge 58 for penetrating the head 60 of the container 14 and a following edge 62 which is less acute for enlarging the opening initiated by the acute edge 58 as at 18 for the reception of the tube 16. The lower face 64 of the casing 24 is preferably made flat to rest against the top edge 66 of the container 14. Once the distance between the face 64 and the bottom 68 of the can is determined, the tube 16 is axially adjusted relative to the casing 24 in the cylindrical portion 54 where it is held in place by a set screw 70 threaded into the casing as at 72. The free end of the set screw is apertured as at 74 to receive a hexed wrench (not shown) for tightening.

A clamp is provided and preferably associated with the free end of the set screw 70 to hold the container 14 and the tube 16 in their described relationship. This clamp comprises a cross sectionally arcuate member 76 apertured as at 78 to telescope freely along the set screw 70. The concavity of the member 76 faces the container 14 with its axis parallel to the axis of the container. The edges 80 of the member 76 engage the sides of the container 14 and are notched as at 82 to register with the beaded portion 84 of the container 14 in an engagement preventing longitudinal displacement thereof.

A winged nut 86 is employed to draw the member 76 along the set screw 70 towards the container 14 to its full clamping relation whereby the inside face 88 of the container 14 is held against the tube 16 and the container against longitudinal displacement relative thereto.

From the description thus far it will be observed that the set screw 70, when tightened, bears the thrust load imposed upon the tube 16 when it is forced downwardly through the head 60 into the sealed container 14 along one side 88 thereof. In event the set screw 70 happens to be loose, purposely or otherwise, the shoulder 53 bears the load, and once the tube 16 advances through the opening 18 made by it, the tube 16 will drop to the bottom 68 of the container, after which the face 64 of the casing 24 is brought into contact with the top of the container 14 and the screw 70 tightened to hold the tube 16 in place. Thereafter the winged nut 86 is turned to a position forcing the clamp member 76 into its operative position already described.

However, it will be appreciated that in event the invention is to be used continuously with containers 14 of the same size, and once the tube 16 is adjusted as to depth relative to the face 64 and the set screw 70 tightened to hold the tube 16 in place, further attention to this detail will be unnecessary and the clamp element 76 and winged nut 86 are the only members which need to be operated when replacing an emptied container with a new one.

In this way the invention accommodates any variations in sizes of cans used by various manufacturers of lubricant and in event an extremely deep container is encountered, a tube 16 of longer length may be readily substituted and brought into operative position as already described.

The crooked nozzle 30 is secured to the casing 24 as by means of a headed bushing 90 threadedly engaging the casing as at 92. The passageway 28 where it extends through the bushing 90 is enlarged at both ends to provide first, an upwardly presenting shoulder 94 against which the end of the crooked nozzle is brought to rest, and welded or soldered in place as at 96, and to provide secondly, a downwardly presenting shoulder 98 serving as an abutment for the spring 100 of the outlet check valve 26. Between the lower end 102 of the bushing 90 and the compartment 22, the casing 24 is enlarged for the reception of a ring valve seat 104 pressed downwardly against a shoulder 106 by a comparatively heavy compression spring 108 disposed between the upper face of the ring 104 and the lower end of the bushing 102. The cross sectional configuration of the ring 104 is of such dimensions that the upper inner marginal edge 110 as tapered (see Fig. 3) provides a seat for the upper outlet valve 26, and its lower face provides an abutment for the spring 112 which closes the inlet valve 20.

The outlet valve 26 is preferably formed of pressed metal having a spherical contour 114 at its lower end and upwardly extending fingers 116 engaging the inner face 118 of the lower enlarged portion of the bushing 90 in a sliding guide relationship.

From the above description of the valve constructions it will be appreciated that both check valves 20 and 26 are assembled through the opening in the casing 24 into which the bushing 90 is threaded and are brought into and maintained in operative position by the respective springs and the ring valve-seat. In this way close manufacturing tolerances are obviated and expense reduced of making devices embodying the invention.

In addition to these details of construction, the inlet valve 20 as shown in Fig. 3 comprises a spherical valve seat engaging head 120 supported by a reduced cylindrical shank portion 122 encircled by several turns of the spring 112 which, in conjunction with its tensioned shape and the foundation afforded by the lower face of the ring 104, prevents the valve 20 from tilting out of operative position.

Another embodiment of the clamping device is illustrated in Fig. 5 where the set screw 70 and winged nut 86 heretofore described are made integral with each other to form a winged bolt 124 so constructed and arranged that the clamping relationship between the clamp member 76 and the container 14 is made fully effective, simultaneous with the clamping of the tube 16 in place.

In use, after the tube has pierced the head 60 of the container 14 and the clamping relationship established, as already described, the handle 40 is reciprocated and due to the displacement present with the cylinder 12, the heavy lubricant in the container 14 is drawn into the tube 16 and past the inlet valve 20 under the vacuum created by the piston assembly 10. Upon the return stroke of the piston assembly, the initial quantity of the lubricant drawn past the inlet valve 20 is forced past the outlet valve 26. This primes the device. Repeated reciprocations draw the bulk of lubricant from the container and force it through the crooked nozzle 30 from which air therein is harmlessly discharged into the housing being filled.

When the container is approximately empty, the vacuum creatable by the suction stroke of a piston, draws air through the container against the top surface of the lubricant and, if the container is tilted slightly, when the level of the lubricant reaches the level of the inlet opening of the tube, aspiration of the residuum takes place by the air operating upon the surface of the lubricant therein at a relative high volumetric rate in such a way that the residuum is picked up from the bottom of the container and carried into the tube 16 and past the inlet valve 20. After this, upon each pressure stroke of the piston assembly 10, whether the working compartment of the cylinder 12 is filled with part air and part lubricant, or filled entirely with air, the pressure created therein will carry any lubricant which remains in the compartment 22 by volumetric velocity and pressure past the outlet valve 26 and through the crooked nozzle 30. It will be appreciated that the air is thus employed to carry the residuary lubricant to the gear housing and is vented harmlessly into the housing with the lubricant it carries.

In event it is found desirable to have the lowermost wall of the cylinder 12 level with or slightly above the compartment 22 in the casing 24, a re-arrangement of the threaded relationship 32 and associated constructions can be made without departing from the teaching of the invention. In such case the last ounces of lubricant remaining in the cylinder 12 will be entirely drained into the compartment 22 for ejection through the outlet valve 26.

Other than this, the passageway leading from the working side of the piston assembly 10 to the compartment 22 may be so shaped and formed as to create within the compartment 22, upon the last few compression strokes, sufficient air and lubricant turbulence to carry the last vestige of lubricant from the compartment 22 through the nozzle 30.

Consequently, although several embodiments and modifiations of the invention have been shown and described herein, it will be apparent to those skilled in the art that various and further uses, modifications and changes may be made therein without departing from the spirit and substance of the invention, the scope of which is commensurate with the appended claims.

What is claimed is:

1. In a lubricant dispenser for sealed containers, the combination of a lubricant intake tube constructed to penetrate the head of said container and to extend to the bottom thereof, means for engaging the top of said container and adjustably supporting said tube, holding means carried by said top engaging means for holding said container relative to said top engaging means, and means for securing said holding means and tube in place with said tube in operative relationship relative to the bottom of said container.

2. A clamping device for a dispenser having an adjustable intake tube adapted to be inserted into a sealed container comprising an arcuate member engaging the sides of said container and notched to prevent longitudinal displacement thereof, and means for bringing said arcuate member and said tube into operative relation simultaneously to hold same in said relationship throughout the operation of emptying said container.

3. A low loss lubricant dispenser for sealed containers comprising a suction tube of comparatively small cross-sectional contour constructed to penetrate and extend to the bottom of a container, a manually operated piston and cylinder of comparatively large displacement, a discharge conduit of comparatively small cross-sectional contour for conveying lubricant from said cylinder to a place of use, a casing supporting said tube, cylinder and conduit in assembled relation and having a restricted chamber in communication therewith, a check valve between said tube and chamber opening towards said chamber, a shoulder between said conduit and chamber facing away from said chamber, a ring valve seat resting upon said shoulder in sealed relationship therewith and supporting said check valve, a second check valve opening away from said chamber and closing against said ring valve seat between said conduit and said chamber, and means for holding said valves and ring valve seat in assembled and operative positions.

4. A low loss lubricant dispenser for sealed containers comprising a tube adapted to penetrate and extend to the bottom of a container, a manually operated piston and cylinder of comparatively large displacement, a discharge conduit for conveying lubricant from said cylinder to a place of use, a casing means supporting said tube in a plurality of positions and cylinder and conduit in assembled relation and having a restricted chamber in communication therewith, a check valve between said tube and chamber opening towards said chamber, a shoulder between said conduit and chamber facing away from said chamber, a ring valve seat resting upon said shoulder in sealed relationship therewith and supporting said check valve, a second check valve opening away from said chamber and closing against said ring valve seat between said conduit and said chamber, and means for holding said valves and ring valve seat in assembled and operative positions.

5. A clamping device for a dispenser with an adjustable intake tube insertable into a sealed container having an offset portion in a wall thereof comprising an arcuate member engaging the sides of said container and notched to mate with said offset portion to prevent relative longitudinal displacement thereof, and clamping means engaging said member and said tube for positioning and securing said tube and member in correct relationship with said container throughout the operation of emptying said container.

6. In a dispenser provided with an intake tube telescoping with a conduit in a casing and insertable into a sealed container having an offset portion, a clamping device comprising an arcuate member engaging the sides of said container and notched to mate with said offset portion to prevent relative longitudinal displacement thereof, means supported by said casing for positioning and securing said tube in said conduit, and means carried by said clamping means and engaging said arcuate member to press the said member against the sides of said container in clamped relationship therewith to support said dispenser relative to said container throughout the operation of emptying said container.

7. A lubricant dispensing device for attachment to a lubricant container having a beaded rim, comprising lubricant pumping means, a tube forming an inlet for said pumping means, and having an end formed to pierce the top of said container closely adjacent the side wall thereof, and a clamping element carried by said pumping means and conformed to engage said beaded rim at two points spaced from said tube, whereby said pumping means may be rigidly secured to said container.

ERNEST W. DAVIS.